United States Patent
Kudou (10) Patent No.: US 6,438,166 B2
(45) Date of Patent: *Aug. 20, 2002

(54) METHOD AND A APPARATUS FOR CONTROLLING A BIT RATE OF PICTURE DATA, AND A STORAGE MEDIUM WHICH STORES A PROGRAM FOR CONTROLLING THE BIT RATE

(75) Inventor: Kei Kudou, Hadano (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,620

(22) Filed: Dec. 4, 1998

(30) Foreign Application Priority Data

Dec. 10, 1997 (JP) .............................. 9-339642

(51) Int. Cl.[7] ................................. H04B 1/66
(52) U.S. Cl. ...................... 375/240; 382/239
(58) Field of Search ........................... 375/240, 240.01, 375/240.03, 240.16, 240.06, 240.25; 348/384.1, 387.1, 390.1, 397.1, 409.1–413.1, 417.1, 437.1; 386/40, 67, 46, 124, 104; 370/232; 395/200.63; 725/86, 95; 709/233; 382/239

(56) References Cited

U.S. PATENT DOCUMENTS

| | | | | |
|---|---|---|---|---|
| 4,868,641 A | * | 9/1989 | Modarese | 375/240.25 |
| 5,604,731 A | * | 2/1997 | Grossglauser | 370/232 |
| 5,621,578 A | * | 4/1997 | Matsumi et al. | 386/104 |
| 5,703,646 A | * | 12/1997 | Oda | 375/240.03 |
| 5,812,786 A | * | 9/1998 | Seazholtz et al. | 709/233 |
| 6,014,492 A | * | 1/2000 | Kim et al. | 386/67 |
| 6,118,817 A | * | 9/2000 | Wang | 375/240 |

FOREIGN PATENT DOCUMENTS

JP           8-46964           2/1996

OTHER PUBLICATIONS

ISO/IEC 11172–1, pp. ii–x, 1993 (author unknown).

* cited by examiner

*Primary Examiner*—Chris Kelley
*Assistant Examiner*—Gims Philippe
(74) *Attorney, Agent, or Firm*—Antonelli, Terry, Stout & Kraus, LLP (57) ABSTRACT

In order to prevent a deterioration in reproduction quality of a moving picture, which is caused by a difference in data transfer rate for each frame of the moving picture data, when compressing the picture data, a bit rate of the compressed data is predicted, thus deriving a prediction value of the data transfer rate after the compression. The compression is performed by modifying the picture so that the prediction value falls within a range which is suitable for a data transfer rate set in advance. The modification of the picture data is performed by writing a pattern for the adjustment into frames of the original picture.

12 Claims, 6 Drawing Sheets

A BIT RATE
FOR EACH PATTERN

FIG.10

METHOD AND A APPARATUS FOR CONTROLLING A BIT RATE OF PICTURE DATA, AND A STORAGE MEDIUM WHICH STORES A PROGRAM FOR CONTROLLING THE BIT RATE

BACKGROUND OF THE INVENTION

The present invention relates to a technique for controlling a bit rate at the time of compressing data on a picture, a voice, and so on.

Picture data or voice data, which is stored in storage devices such as a hard disk or a CD-ROM, is of tremendous amounts. This situation makes it necessary to compress the data so that the amount thereof for a single frame falls within a level (i.e. data transfer rate) corresponding with a specified capacity of the CD-ROM or abilities of the transmission path. Techniques such as JPEG and MPEG are known as compression systems therefor. These are methods in which a combination of orthogonal transformation and variable length coding plays a role of allowing the data to be compressed (a reference literature: ISO/IEC 11172-2). An overview of the methods will be explained below, using FIG. 10.

Figure 10:
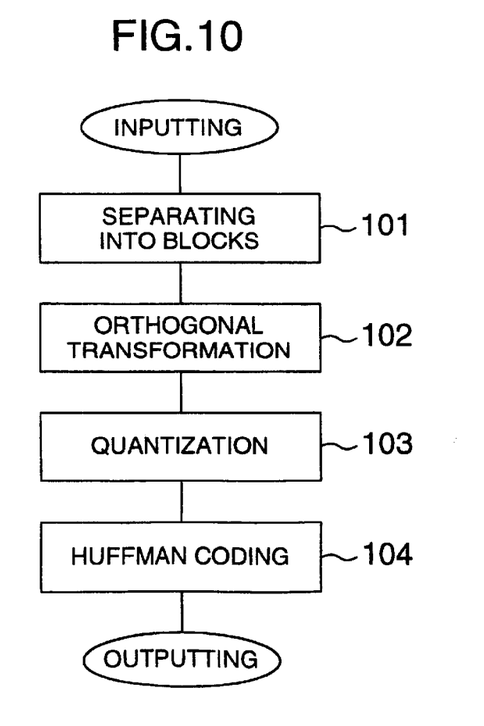
FIG. 10 is a flow chart for showing a compression processing in a prior art.

First, when data to be compressed, for example picture data, is inputted, a frame is separated into a certain number of blocks (101). Since, according to the standard, the number of effective pixels for each line is 720 and the number of lines for each frame is 480, the number of pixels for each frame becomes equal to 345,600. It is usually specified that one block consists of 8 by 8 pixels, and thus one frame is eventually separated into 5400 units of blocks.

Next, orthogonal transformation coding is performed for each of the separated blocks, thereby reducing redundancy which the picture data contains (102). Although a DCT (discrete cosine transformation) is employed most widely in the MPEG, there are other orthogonal transformation systems. such as Karhunen-Loeve transformation and Fourier transformation. In the DCT, the picture data, for each of the separated blocks, is transformed into frequency DC element and frequency AC element. When one block consists of 8 by 8 pixels, a two-dimensional DCT is performed first, and, after being transformed, the data is stored in an 8- by 8-pixel matrix in the order of increasing frequency from the side of the point of origin. In the MPEG, the DCT is executed not only for intraframe picture data but also for an interframe motion-compensated prediction error signal. On account of this, in a picture with no or little motion such as a still picture, data after being transformed becomes zero. This makes the block an ineffective one.

In order to further reduce data transfer rate of the signal, the redundancy of which has been reduced using the orthogonal transformation, quantization of the signal is performed so as to digitize the data (103). In this processing, the orthogonalized data, depending on the respective frequency region, is divided by a quantizing coefficient. Usually, taking advantage of the fact that visual perception of humans is not sensitive to the high frequency region, the high frequency components are divided by a large quantizing coefficient. In this way, the high frequency region is roughly quantized and the amount of the data is caused to be concentrated in the low frequency region, thereby aiming at reducing the whole amount of the data.

The next step is to perform, using Huffman coding and so on, variable length coding of the frequency components quantized at a step 103 (104). At this time, concerning the direct voltage components, it is executed to carry out Huffman coding of difference values toward direct voltage components in a block in proximity to the present block. Concerning the alternating voltage components, the following encoding is executed: First, a scanning, which is called a zigzag scan and is carried out from a low frequency component to a high frequency one, is performed. Then, a two-dimensional Huffman coding thereof is performed based on the number of ineffective (i.e. the value is equal to zero) and successive components and values of effective components subsequent thereto.

In this compression technique, there exists a problem that the data transfer rate takes on no fixed value. Namely, since the quantized data is processed using Huffman coding which belongs to the variable length coding, it turns out that a generated bit rate takes on a different value for each picture. As a result of this, the data transfer rate takes on no fixed value, for the data transfer rate is a value obtained by multiplying the generated bit rate for one frame by the number of frames reproduced per second. For example, when wishing to insert for a few seconds a still picture, which is intended for appealingly informing conversion of a scene, into a pause in scenes of a moving picture, if a monotonous still picture (for example, a picture all the pixels of which have an identical color) continues to be inserted, the compression rate becomes higher and only the portion into which the monotonous still picture is inserted comes to exhibit a lower data transfer rate as compared with the other portions. If the portion into which such a monotonous moving picture is inserted is reproduced, since the actual data transfer rate is lower than a data transfer rate stored in a header, there occurs a phenomenon such as a frame skipping. This brings about a deterioration in reproduction quality (accuracy) of the moving picture.

As disclosed in JP-A-8-46964 as a technique for solving the above-mentioned problem, there is a technique which, concerning the data after being processed by Huffman coding, allows the generated bit rate to be adjusted in a unit which consists of a plurality of blocks. In this technique, the quantizing coefficient is set so that, on a first frame of input data, a generated bit rate for the entire frames is smaller than but very near to a planned bit rate. Adjustment of a generated bit rate after the first frame is performed in a macroblock unit which is constituted by summarizing a plurality of blocks. An encoding processing in the macroblock unit is as follows: First, quantization for each block is performed and the resultant data is stored in a memory. Next, the data is read out from the memory, then being encoded while monitoring a bit rate generated by one block in terms of the macroblock unit. When the encoding for one macroblock is over, the generated bit rate in the macroblock unit is compared with an allotted bit rate. When the generated bit rate is smaller, a pseudo data bit string is inserted. The generated bit rate for each macroblock is adjusted in this manner.

In the above-described prior art, a generated bit rate on the after-compression picture data is judged for each macroblock, and then necessary amounts of pseudo data bit string is added so as to adjust the transfer bit rate. This transaction makes it unavoidable to deal with data other than display data at the time of an expansion processing, thus complicating an algorithm for expansion processing.

SUMMARY OF THE INVENTION

It is an object of the present invention to provide a method and an apparatus which, without exerting any influence upon an expansion processing, make it possible to easily adjust the generated bit rate with the use of an existing compression processing, a storage medium which stores a program readable by information processing devices, and an information processing device for executing the program stored in the storage medium.

According to the present invention, in a method of controlling a bit rate at the time of compressing picture data, a comparison between a generated bit rate and a planned bit rate is performed for each frame of the compressed input data. When the generated bit rate is found to be smaller, pixels, with a regular (or an irregular) pattern, are mixed onto the picture to be compressed. In this way, in the present invention, the pattern consisting of pixels is directly added over to the picture of an object to be compressed, thereby increasing the insufficient bit rate. This transaction makes it possible to control the bit rate after the processing without the necessity of modifying an algorithm for expansion processing of the after-compression data. Moreover, there is no necessity of removing the pattern added over at the time of the expansion processing. Also, the pattern to be added over is formed using more minute pixels or a color tone thereof is harmonized with that of the original picture. These transactions further reduce visual influences exerted upon the picture after being compressed.

DESCRIPTION OF THE PREFERRED EMBODIMENT

The detailed description will be given below concerning an embodiment of the present invention, using the accompanying drawings. The present embodiment is an example in which, when synthesizing moving picture data and voice data which differ from each other in the length, still picture data by an amount of the difference therebetween is compensated.

Figure 1:
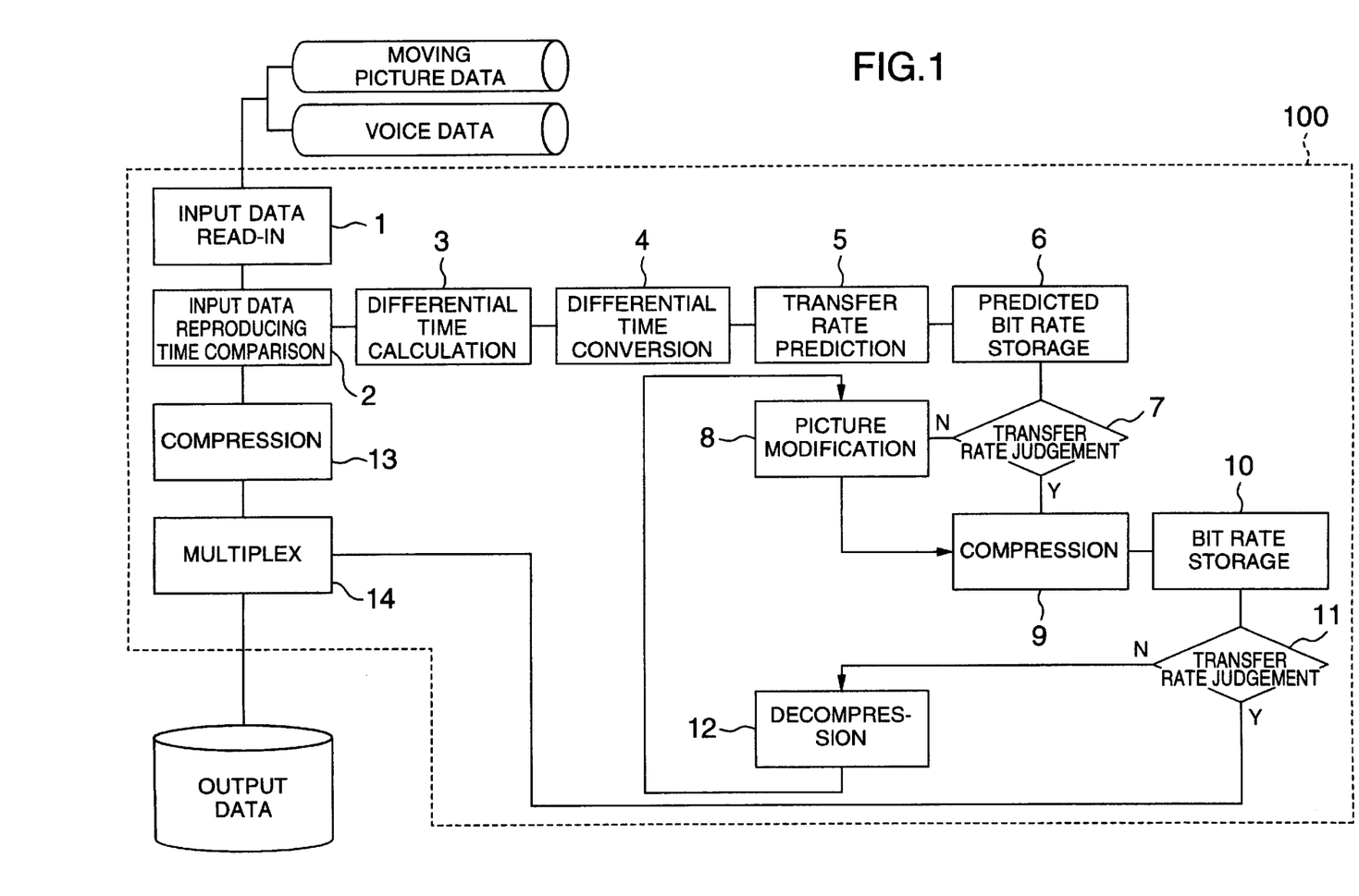
FIG. 1 is a flow chart for showing a flow of processings in an embodiment of the present invention.
Figure 2:
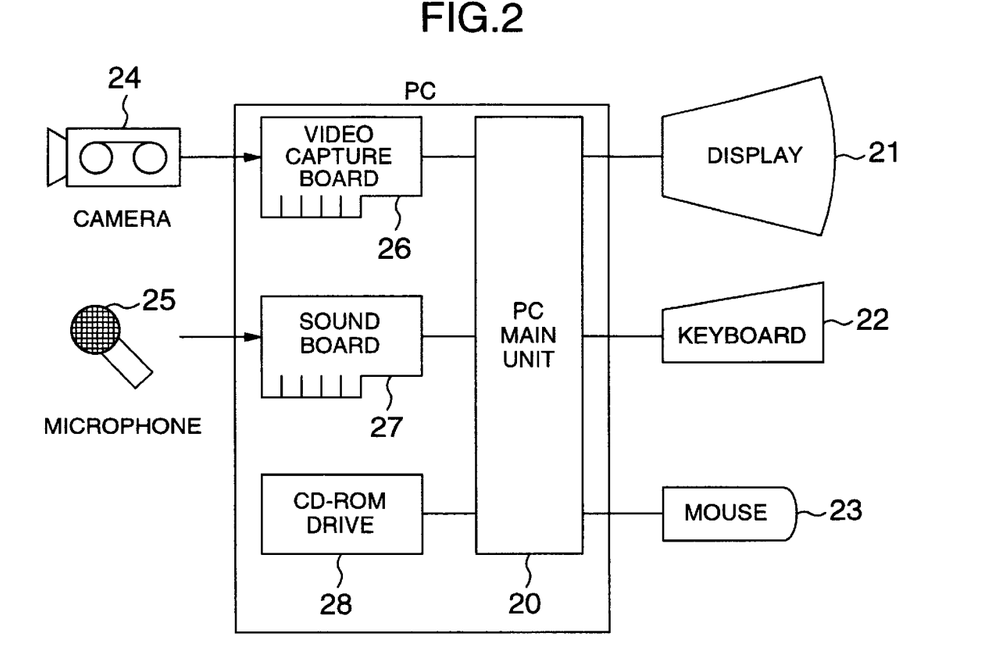
FIG. 2 is a block diagram for showing a system configuration of the embodiment of the present invention.
Figure 3:
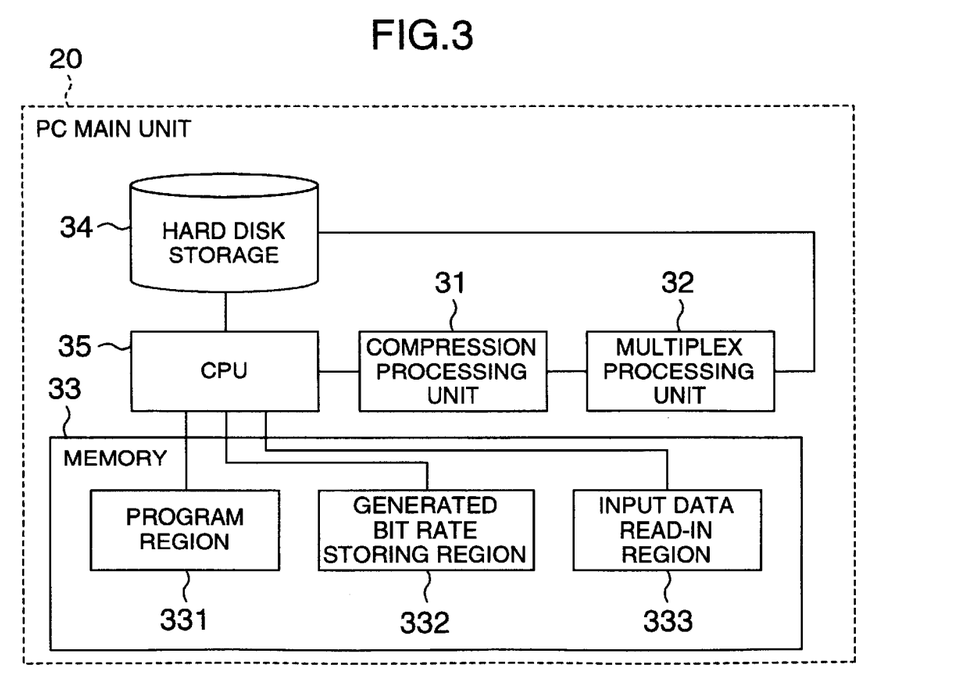
FIG. 3 is a block diagram for showing details of a hardware configuration of a PC main unit 20 shown in FIG. 2.
Figure 4:
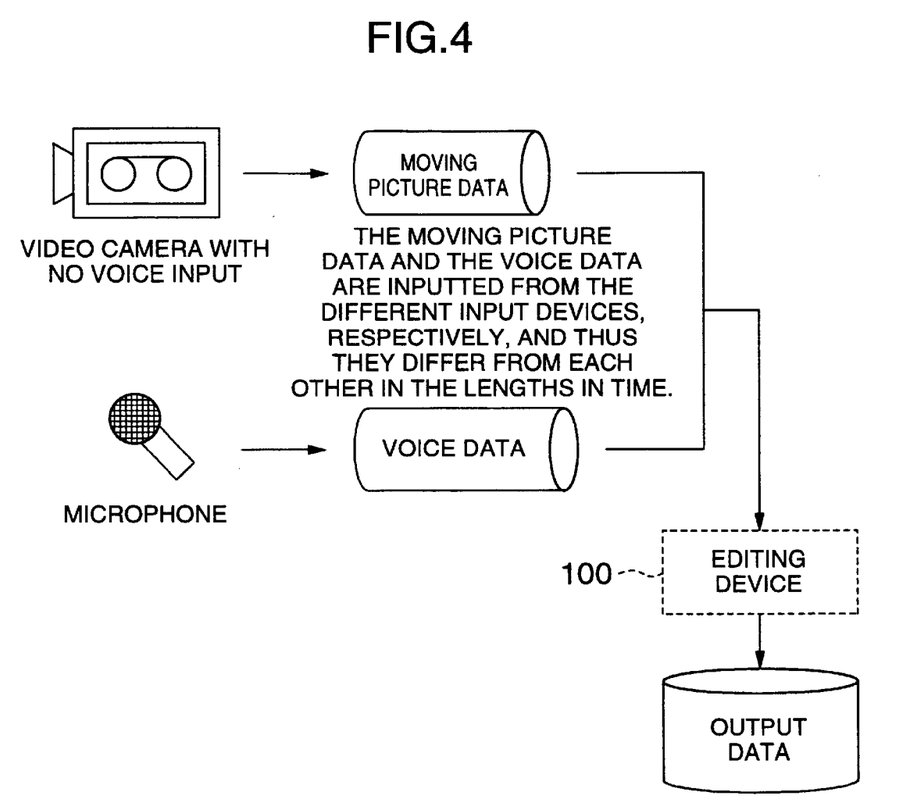
FIG. 4 is a diagram for representing a difference in length between inputted moving picture data and voice data.

FIG. 1 is a flow chart for showing software processings in an embodiment of the present invention. FIG. 2 is a configuration diagram of a personal computer (PC) system into which the present invention is integrated as a hardware apparatus. FIG. 3 is a hardware configuration diagram of a PC main unit.

As described in FIG. 2, the system comprises the PC main unit 20, a display device 21, i.e. one of output devices, a keyboard 22 and a mouse 23, i.e. input devices, a camera 24 for inputting picture data, and a microphone 25 for inputting voice data. A command or instruction for starting an edit processing is displayed on the display device 21, and the processing is started by an input of the command from the keyboard 22 or the mouse 23.

Devices installed on the PC main unit 20 are a video capture board 26 for digitizing a picture inputted from the camera 24, a sound board 27 for digitizing voice data inputted from the microphone 25, and a CD-ROM drive 28. A CD-ROM which stores a program for embodying the present invention is housed in the CD-ROM drive 28. The program is loaded from the CD-ROM, and is stored in a memory in the PC main unit. Based on the program stored in the memory and toward the moving picture data and the voice data, an edit processing, such as compression or synthesis, and control of a bit rate are performed inside the PC main unit.

FIG. 3 shows details of the inside of the PC main unit. The PC main unit 20 comprises a compression processing unit 31 for performing a compression processing of input data, a multiplex processing unit 32 for synchronizing the moving picture data with the voice data to synthesize them into a piece of data, a memory 33 which stores programs such as control programs of the compression processing unit 31 and the multiplex processing unit 32, a hard disk storage 34 for storing the input data and output data after being multiplex-processed, and a CPU 35 for performing exchange and control of the data therebetween. Inside the memory 33, there exist a program region 331 for storing a program for executing the present invention, a generated bit rate storing region 332 for storing a generated bit rate after the compression, an input data read-in region 333 for storing the input data to be compressed, and so on.

Also, in the compression processing unit 31, the DCT transformation is employed as the orthogonal transformation and Huffman coding is employed as the variable length coding.

Next, using FIGS. 1 to 6, the description will be given concerning a flow of the entire processings in the present invention. First, using FIG. 4, the description will be given concerning data used in the embodiment of the present invention. In the present embodiment, the moving picture data is grabbed from the camera 24 with no voice input, whereas the voice data is grabbed from the microphone 25. Then, the two kinds of data, after being edited by an editing device 100, are outputted as a piece of data. In this way, the moving picture data and the voice data are inputted from the different input devices, respectively, and thus they, in some cases, differ from each other in the lengths in time for reproduction.

Figure 5:
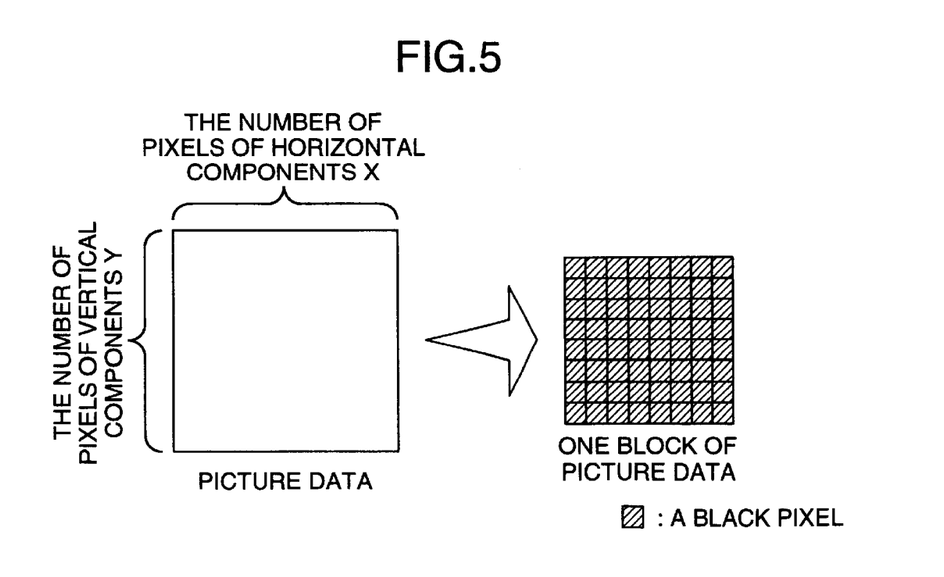
FIG. 5 is a diagram for showing picture data introduced into a differential time conversion processing 4 shown in FIG. 1.

Accordingly, the program in the present invention has a means which, when a reproduction time for the moving picture data is shorter than a reproduction time for the voice data, makes it possible to compensate differential frames corresponding to the difference. Picture data as illustrated in FIG. 5 is employed as picture data on the differential frames for performing the compensation. In FIG. 5, concerning the picture data for the compensation, pixels in one block thereof, which is obtained when the separation into blocks is performed in the compression processing, are all black pixels.

Next, using FIG. 1, the description will be given below concerning a flow of the processings in the present embodiment. It is assumed that the picture data or the voice data grabbed in the PC lies in the following state: The data has already undergone edit processings, such as the compression processing, a generated bit rate control processing and the multiplex processing, and is now stored in a storage device such as the hard disk.

First, the picture and the voice data stored in the hard disk storage 34 from the input devices are accessed, and parameters, such as the total numbers of frames of the picture and the voice data and the frame rate (the number of pictures displayed per second), and the picture and the voice data themselves are read into the input data read-in region 333 in the memory 33 (step 1).

Next, the reproduction time for the read moving picture data and the reproduction time for the read voice data are calculated in accordance with the following calculation formulas, and the calculation results are compared with each other (step 2).

Letting

Tv: a reproduction time for the moving picture data

Nv: the number of the frames reproduced per second

Ta: a reproduction time for the voice data

Na: the number of the frames reproduced per second,

Tv=the total number of frames of the inputted moving picture data/Nv

Ta=the total number of frames of the inputted voice data/Na are calculated, respectively, and a large-and-small relationship between Tv and Ta thus calculated is checked, thereby judging which of the reproduction times is longer between the reproduction time for the moving picture data and that for the voice data.

As a result of the comparison, if the reproduction time for the moving picture data is found to be shorter than that for the voice data, differential frames-compensating processings (i.e. processings from step 3 to step 12) are executed.

In the differential frames-compensating processings, a difference between the reproduction time for the moving picture data and that for the voice data is calculated in accordance with a calculation formula: "a difference between the reproduction time for the moving picture data and that for the voice data=Tv−Ta" (step 3).

Next, in order to convert the calculation result into the number of frames of the moving picture data, the following calculation formula is executed (step 4):

the number of differential frames for the moving picture data=
(Tv−Ta)*Nv.

By the amount corresponding to the number of differential frames obtained in this calculation, the picture data for the compensation, the pixels of which are all black pixels, is added to an end portion of the moving picture data.

Next, based on a size of the inputted picture data and the reproduction time for the moving picture data, a bit rate generated per second (an amount of data after being compressed) is predicted. Concretely, by executing a calculation formula: "a bit rate generated per second=a size of the inputted picture data/a reproduction time for the moving picture data", a predicted bit rate is calculated and is converted into a prediction value of the data transfer rate (step 5), then being stored into a work memory (step 6). The prediction of the bit rate is performed for each frame and, as described above, the predicted value is converted into the data transfer rate, thus obtaining the prediction value of the data transfer rate. It is also allowable that the prediction value of the data transfer rate is set to be determined by multiplying a predicted bit rate for each frame by the number of the frames reproduced per second, or by multiplying the predicted bit rate for each frame by a constant of an appropriate value.

Figure 7:
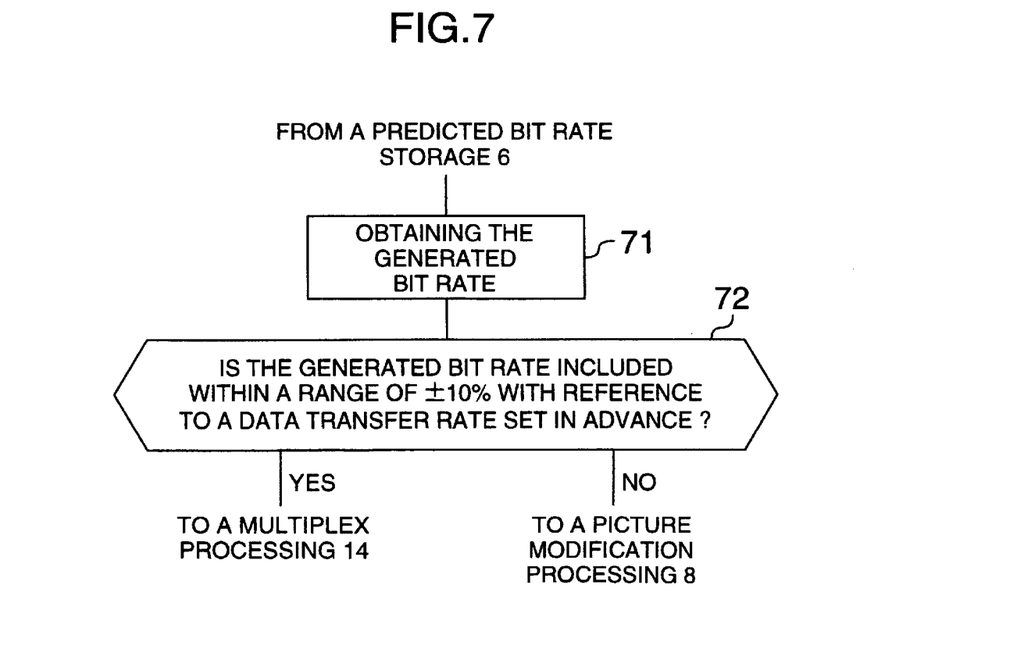
FIG. 7 is a flow chart for showing details of a data transfer rate judgement processing.

Next, it is judged whether or not the prediction value of the data transfer rate is a bit rate which is suitable for a data transfer rate set in advance (step 7). It is decided that a value of the data transfer rate set in advance should be stored beforehand in the memory 33 before starting the transfer rate prediction processing (step 5) or a compression processing. The judgement processing at the step 7 will be explained in detail, using FIG. 7. First, at the time when the prediction by the amount of one frame is finished, a prediction value of the data transfer amount until then is obtained from the work memory (step 71). Then, it is judged whether or not the prediction value obtained at the step 71 is a bit rate suitable for a data transfer rate set in advance. In the present embodiment, the condition employed as a criterion for this judgement is whether or not the generated bit rate falls within a range of ±10% with reference to the data transfer rate determined in advance (step 72). If the generated bit rate falls within the set condition range, go to a step 9 and a compression processing is performed. If the generated bit rate is not found to be within the range of ±10%, go to a step 8 and a processing for increasing the generated bit rate is performed. For example, it is assumed that the data transfer rate is, in advance, set to be 1,150,000 bps (Bits Per Second). Meanwhile, when the picture data, the pixels of which are all black pixels (refer to FIG. 5) and which is used for the compensation in the present embodiment, is compressed and the generated bit rate arising therefrom is converted into the data transfer rate, the converted value becomes equal to about 53,000 bps. This makes up only about 4.6% of the above-mentioned set data transfer rate and thus is unsuitable for the set data transfer rate. In this case, accordingly, go to the step 8 and a picture modification processing is performed.

Figure 6:
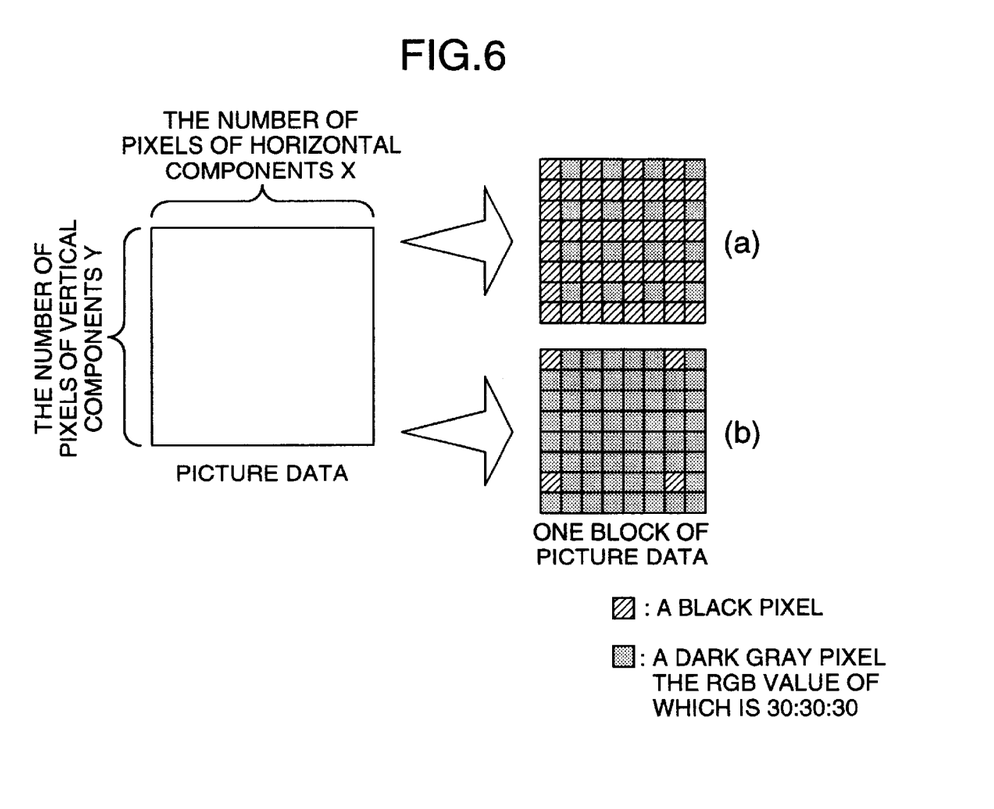
FIG. 6 is a diagram for showing picture data for explaining the modification processings in FIG. 1.

If the prediction value of the data transfer rate turns out to be no suitable one, in order to increase the generated bit rate, the following modification processing is performed (step 8): Dark gray pixels the RGB value of which is 30:30:30 are mixed onto the inputted frame with a pattern which, as shown in FIG. 6, allows the high frequency components to be increased at the time of the DCT transformation. The modification processing will be explained in detail later, referring to FIG. 8.

Next, a compression processing is performed toward the picture data (step 9), and a bit rate generated after the compression is converted into a prediction value of the data transfer rate in much the same way as described above, then being stored into the work memory (step 10). Then, in much the same way as that at the step 7, it is ascertained whether or not the prediction value of the data transfer rate is a suitable value as compared with a data transfer rate set in advance (step 11). If the generated bit rate is judged to be suitable for the set data transfer rate, go to a step 14 and a multiplex processing is performed, thus outputting the moving picture data and the voice data as a piece of data. If the generated bit rate is judged to be unsuitable, the compressed data is decompressed. Then, with the degree of modification being enhanced in the modification processing, the modification processing is performed again, thus repeating the processings from the step 9 to the step 11.

Figure 8:
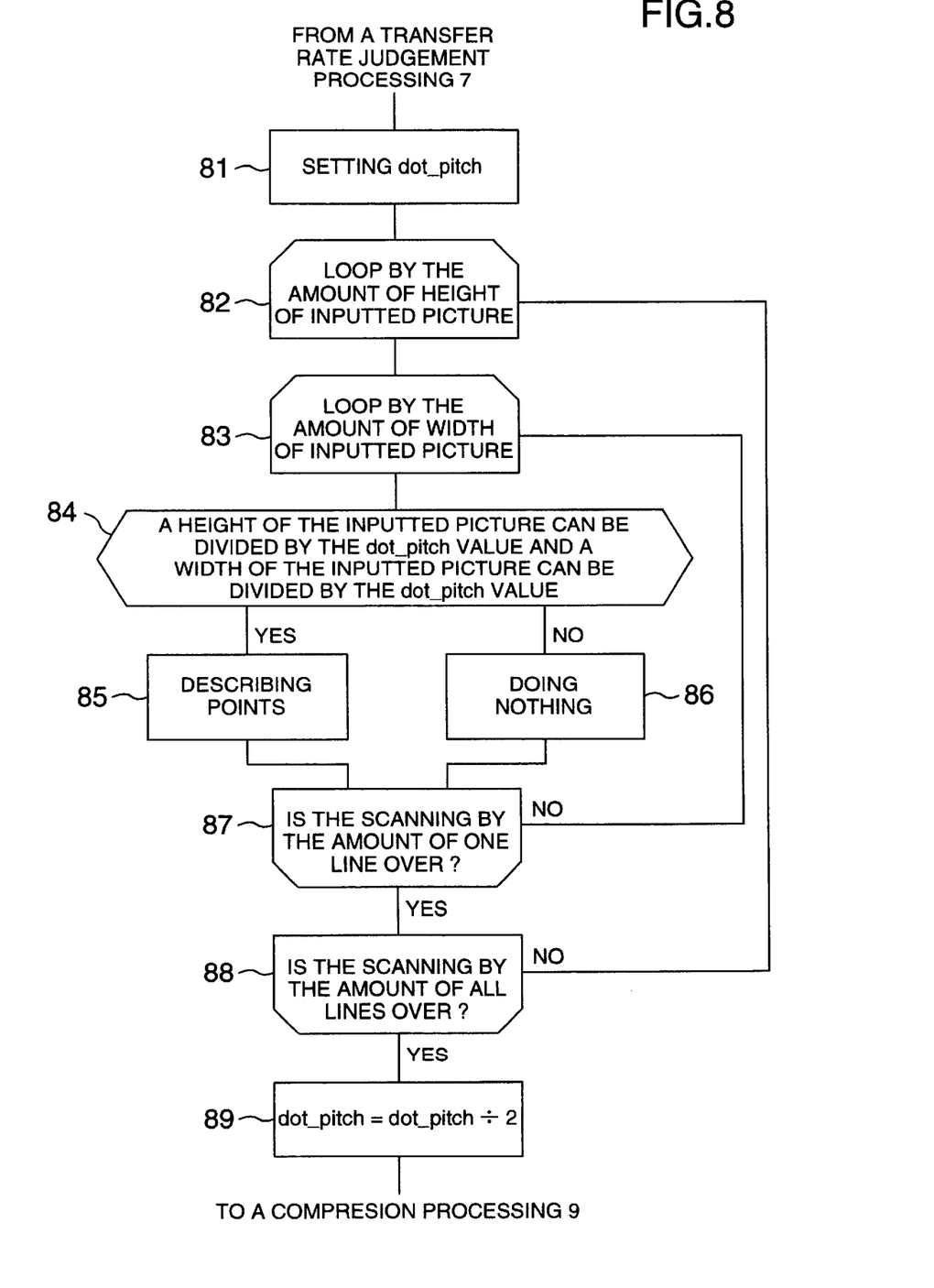
FIG. 8 is a flow chart for showing details of the modification processings.

Next, the detailed description will be given below concerning the picture modification processing at the step 8, using a flow chart in FIG. 8. First, at a step 81, it is judged whether or not a value of dot pitch of a pattern used for the picture modification is set. If the dot pitch is not set, an initial value of the dot pitch is set to be, for example, 8. This means that, since one block consists of 8 by 8 pixels in the present embodiment, the first overlapped pattern is set to be the roughest pattern. If the dot pitch is set, the value will be used in the following processings:

At a step 82, in order to describe points onto an inputted picture, i.e. an object to be modified, the y-coordinates (values in height of the inputted picture) are obtained. At a step 83, the x-coordinates (values in width of the inputted picture) are obtained, and go to a step 84. At the step 84, it is decided whether or not points should be described onto the present (x, y) coordinate. For example, at present, if a value of (x, y) is (1, 1), no point is described since neither of the x, y coordinates can be divided by 8, and thus go to a step 87. If the coordinate is (1, 8), since the x coordinate can not be divided by 8, go to the step 87 as well. Also, if the coordinate is (8, 8), since both of the x, y coordinates can be divided by 8, go to a step 85 and a pixel are described.

At the step 87, it is judged whether or not the scanning about one line is over. If it is not over, go back to the step 83, and the describing operation by the amount of one line is performed. If the scanning about one line is over, go to a step 88, and this time it is judged whether or not the scanning is over concerning all lines. If it is not over, go back to the step 82, and the scanning about the next line is started. If the scanning about all lines is over, go to a step 89.

At the step 89, in order to make more minute the modifying picture used when the modification processing is performed next time, the dot pitch set at the step 81 is divided by 2 and then a compression processing is performed toward the picture after being modified.

The transfer rate judgement processing is performed again concerning a generated bit rate after the compression, and the modification and the compression are repeated until the condition is satisfied.

When a DCT transformation is performed toward an inputted picture onto which pixels whose RGB value or YUV value are close to the value of the other original pixels are mixed by the modification processing with a pattern illustrated in, for example, (a) in FIG. 6, there occur variations in the pixel values within an identical block. This increases the high frequency components as compared with the case of the pattern in FIG. 5, thus causing the bit rate to be generated in great quantities in the subsequent quantizing processing and Huffman coding processing. In the case of using the pattern in (a) of FIG. 6, the generated bit rate becomes equal to about 1,151,000 bps. As is clearly seen from a comparison with the set data transfer rate, this value is suitable therefor.

Moreover, repeating this processing by the amount of the number of the differential frames makes it possible to generate the moving picture data for compensating a difference produced between the inputted moving picture data and the inputted voice data in the lengths in time. This further makes it possible to prepare moving picture data and voice data the lengths in time of which coincide with each other. By multiplexing these coincided data in the multiplex processing 14, it becomes possible to output data of high reproduction quality (accuracy).

Figure 9:
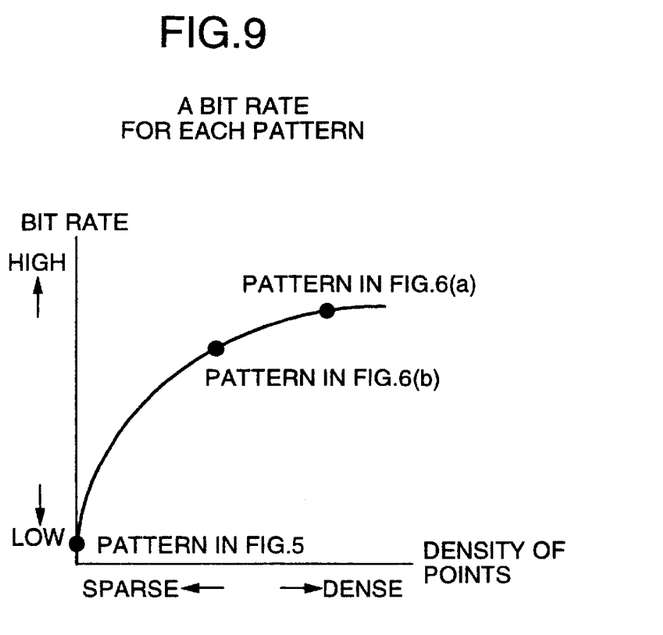
FIG. 9 is a graph for showing a relationship between a generated bit rate and a density of points described onto inputted moving picture data.

There are a variety of patterns when the pixels are mixed (refer to (a) and (b) in FIG. 6). Selection of the patterns thereof allows the generated bit rate to be controlled. FIG. 9 is a graph for showing a relationship between a density of pixels to be mixed and a generated bit rate. In the present embodiment, the dot pitch is made narrower gradually in the picture modification processing, thereby adjusting the data transfer rate after the compression into the set condition range. Meanwhile, it is possible to reduce the number of the loops by performing the modification processing in the following manner: An index for indicating a correlation between the generated bit rate and the patterns is prepared in advance, and a value of the dot pitch, which is appropriate enough to compensate an insufficient bit rate obtained by the data transfer rate judgement processing, is determined in advance, then performing the modification processing. Also, it is allowable to employ a modification processing which causes the data transfer rate after the compression to come nearer to the predetermined data transfer rate in the following manner: Information on the modifying patterns and the bit rate corresponding thereto is prepared in advance and, based on the information, an appropriate pattern is selected from a plurality of the modifying patterns, then performing the modification processing.

Also, the picture, which is merged at the step 4 in FIG. 1 for adjusting the difference in the lengths in time between the moving picture data and the voice data, is changed from the kind of picture as illustrated in FIG.5, the pixels of which are all pitch-black pixels, to the kind of picture as illustrated in FIG. 6 in which the data transfer rate is taken into consideration. This transaction is preferable in shortening a time for the processing.

As described above, the present invention, by taking advantage of the simple algorithm, makes it possible to easily adjust the generated bit rate in the compression processing. Since the picture data itself to be reproduced is modified, there is no need of removing the data added in the expansion processing. Based on a color of picture data before being modified, picture data, the color of which is similar to that of the picture data before being modified, is employed as picture data to be added thereto or mixed thereon. This transaction, when applied not only to the merge picture but also to the original moving picture, allows the data transfer rate to be adjusted with no particular visual difficulty.

I claim:

1. A method of controlling a generated bit rate of moving picture data, comprising the processes of:
    setting a data transfer rate of said moving picture data;
    judging whether or not a data transfer rate for each frame of said moving picture data after being compressed is included within a predetermined range for said set value; and
    when it is not included within the predetermined range for said set value, performing a modification processing so that said data transfer rate for each frame after being compressed increases such that the data transfer rate falls within the predetermined range for said set value, wherein said modification process is a process of writing a predetermined picture pattern into a frame to be modified.

2. The method of controlling a generated bit rate of moving picture data as claimed in claim 1, wherein, with a plurality of said picture patterns stored, said modification process selects and writes one picture pattern from the plurality of said picture patterns in correspondence with a result of the comparison performed in said judging process.

3. The method of controlling a generated bit rate of moving picture data as claimed in claim 1, wherein said modification process is a process of repeating the modification processing in such a manner that a modifying rate for the frame to be modified is gradually increased until said data transfer rate for each frame after being compressed becomes equal to said set value.

4. The method of controlling a generated bit rate of moving picture data as claimed in claim 2, further comprising a process of determining, based on the result of the judgement performed in said judging process, a modifying rate for the frame to be modified and wherein said modifying process performs the modifying processing at the rate determined in said modifying rate determining process.

5. An apparatus for controlling a generated bit rate of moving picture data, comprising:

a means for setting a data transfer rate of said moving picture data;

a means for judging whether or not a data transfer rate for each frame of said moving picture data after being compressed is included within a predetermined range for said set value; and a means which, when it is not included within the predetermined range for said set value, performs a modification processing so that said data transfer rate for each frame after being compressed increases such that the data transfer rate for each frame after being compressed falls within the predetermined range for said set value, wherein said manipulating means comprises a means for writing a predetermined picture pattern into a frame to be modified.

6. The apparatus for controlling a generated bit rate of moving picture data as claimed in claim 5, further comprising a storing means for storing a plurality of said picture patterns and wherein said modifying means comprises a means for selecting and writing one picture pattern from the plurality of said picture patterns in correspondence with a result of the comparison performed in said judging means.

7. The apparatus for controlling a generated bit rate of moving picture data as claimed in claim 5, wherein said modifying means comprises a means for repeating the modification processing in such a manner that a modifying rate for the frame to be modified is gradually increased until said data transfer rate for each frame after being compressed becomes equal to said set value.

8. The apparatus for controlling a generated bit rate of moving picture data as claimed in claim 6, further comprising a means for determining, based on the result of the judgement performed in said judging process, a modifying rate for the frame to be modified and wherein said modifying means performs the modifying processing at the rate determined in said modifying rate determining means.

9. A storage medium accessed by an information processing device storing a program for controlling a generated bit rate of moving picture data, wherein said program for controlling a generated bit rate comprises the following processes of:

setting a data transfer rate of said moving picture data;

judging whether or not a data transfer rate for each frame of said moving picture data after being compressed is included within a predetermined range for said set value; and when it is not included within the predetermined range for said set value, performing a modification processing so that said data transfer rate for each frame after being compressed increases such that the data transfer rate falls within the predetermined range for said set value, wherein said modification process includes a process of writing a predetermined picture pattern into a frame to be modified.

10. The storage medium as claimed in claim 9, further including a process of holding a plurality of said picture patterns and wherein said modification process is a process of selecting and writing one picture pattern from the plurality of said picture patterns in correspondence with a result of the comparison performed in said judging process.

11. The storage medium as claimed in claim 10, further including a process of determining, based on the result of the judgement performed in said judging process, a modifying rate for the frame to be modified and wherein said modifying process performs the modifying processing at the rate determined in said modifying rate determining process.

12. A data compressing device, comprising:

a circuit for reading-in a moving picture;

a circuit for compressing said read-in moving picture; and a circuit which, by mixing pixels with a predetermined pattern onto a picture to be compressed, allows the bit rate to be increased such that the bit rate falls within a predetermined range for a set data transfer rate.

* * * * *